United States Patent [19]

Hards

[11] Patent Number: 4,640,160

[45] Date of Patent: Feb. 3, 1987

[54] SWEEP-DATA-RESPONSIVE, HIGH-SPEED, CONTINUOUS-LOG-TRAVEL BUCKING APPARATUS

[75] Inventor: John E. Hards, Delta, Canada

[73] Assignee: Brunette Machine Works, Ltd., New Westminster, Canada

[21] Appl. No.: 806,502

[22] Filed: Dec. 9, 1985

[51] Int. Cl.$^4$ .............................................. B27B 7/00
[52] U.S. Cl. .......................................... 83/71; 83/287; 83/289; 83/364; 83/365; 83/370; 144/379
[58] Field of Search ................... 83/71, 287, 289, 364, 83/365, 370; 144/379; 356/376, 377, 384, 385

[56] References Cited

U.S. PATENT DOCUMENTS 3,848,646 11/1974 Miles .............................. 144/379 X
4,485,861 12/1984 Nilsson et al. ...................... 83/71 X
4,541,722 9/1985 Jenks ................................. 83/365 X
4,548,247 10/1985 Eklund ............................... 83/71 X Primary Examiner—Frank T. Yost
Attorney, Agent, or Firm—Kolisch, Hartwell & Dickinson

[57] ABSTRACT

A high-throughput, high-end-product-recovery log-bucking system featuring continuous log travel. The system includes a flying-saw, log-bucking mechanism in combination with an upstream scanner which is capable of producing data related to a log's "sweep." A computer which is interposed the bucking mechanism and the scanner makes a decision at least partially based on log-sweep data, as developed by the scanner, to determine the optimum bucking position(s) along a log's length to obtain the maximum recovery of usable end-product.

2 Claims, 5 Drawing Figures

SWEEP-DATA-RESPONSIVE, HIGH-SPEED, CONTINUOUS-LOG-TRAVEL BUCKING APPARATUS

BACKGROUND AND SUMMARY OF THE INVENTION

This invention relates to a high-speed log-bucking system, and more particularly to such a system which handles logs on a continuous log-travel basis, with pre-bucking profile scanning taking place to optimize final wood-product recovery. Specifically, the invention relates to a system which features a flying-saw, log-bucking mechanism combined with an upstream (relative to the bucking mechanism) configuration-scanning system which produces, along with log-length and diameter information, data relating to a log's "sweep"—what might be thought of as the log's bent-along-its-length characteristics.

How a log bends or curves along its length, "sweeps", plays an important role in determining the maximum successful recovery of usable wood end-products (such as lumber) from the log; and, how quickly a log's sweep data, if available, can be translated into bucking (cross-cutting) control determines significantly how quickly the log can be processed into the desired final product(s).

To date, sweep data, automatically generated through modern scanning apparatus, has not been used effectively to control or significantly affect log bucking. Accordingly, and because of the importance to economic log bucking of taking sweep data into account, a general object of the present invention is to provide a system which takes such data into account in a highly effective and successful manner.

More particularly, an object of the invention is to provide a high-throughput, high-end-product-recovery log-bucking apparatus which effectively utilizes automatic-scanning-produced sweep data to effect the operation of a high-speed log-bucking machine.

According to a preferred embodiment of the invention, the same includes a transport conveyor which defines an endo log-transport path for the continuous movement of a log endo along the path during a bucking operation. Employed to carry out the actual bucking operation is a high-speed, flying-saw, log-bucking mechanism which operates as a log continues its travel. This mechanism works in cooporation with an upstream scanner which looks at a log traveling on the conveyor in such a manner as to produce, along with data relating to a log's length and diameter characteristics, data relating to a log's sweep.

Operation of this scanning apparatus is facilitated by the fact that the conveyor defines a substantially flat support deck for the transport of a log, whereby substantially all logs passing through the system lie naturally with their sweep plainly exposed to a direct overhead scanning device.

Operatively coupling the scanning and log-bucking components of the system is a program-controlled digital computer which translates log-scan-characteristic data, and particularly sweep data, into quickly implementable control signals that directly affect the operation of the flying-saw log bucker.

The various features and advantages of the proposed system will become more fully apparent as the description which now follows is read in conjunction with the accompanying drawings.

DETAILED DESCRIPTION OF THE INVENTION

Figure 1:
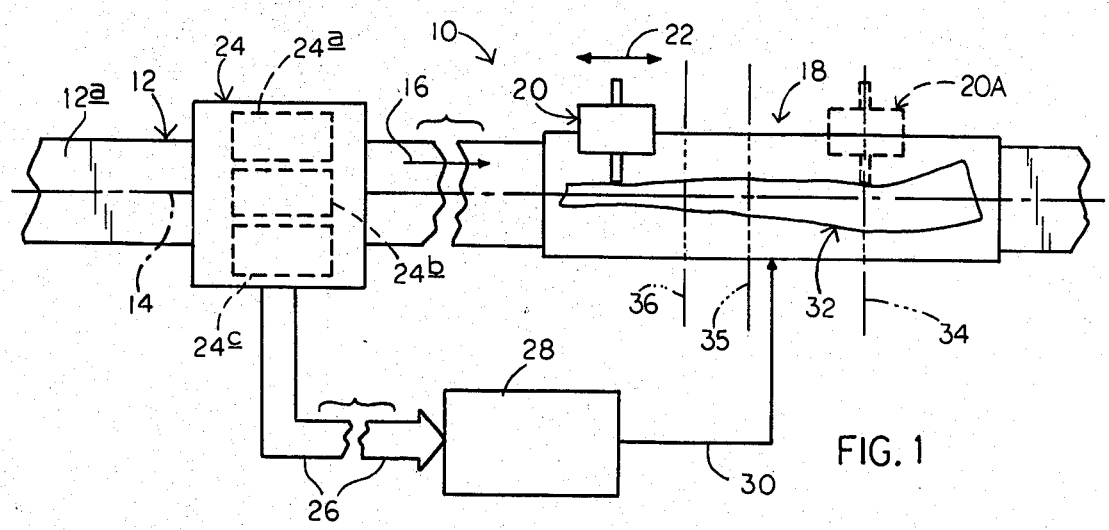
FIG. 1 is a schematic plan view illustrating log-bucking apparatus constructed in accordance with the present invention, with a log, having particular sweep characteristics, displayed in a condition being processed by the apparatus.

Turning now to the drawings, and referring first to FIG. 1, indicated generally at 10 is a log-bucking apparatus which is constructed in accordance with the present invention. Apparatus 10 includes a conventional conveyor, or transport means, 12, which provides a substantially flat upper surface 12a, for transporting successive logs along what is referred to herein as an endo log-support path 14, generally in the direction of arrow 16 at a typical transport speed in the range of about 150–250-feet-per-minute.

Indicated generally at 18 is what is referred to herein as flying-saw, long-bucking apparatus, which includes a flying bucking saw shown in solid outline at 20, and in "dashed" lines at 20A, which saw can reciprocate along the length of apparatus 18, as indicated by double-ended arrow 22.

Apparatus 18 is constructed in accordance with the teachings of the prior-filed, now-pending patent application of John E. Hards, entitled "Flying Bucksaw Apparatus and Method", filed Sept. 7, 1984, Ser. No. 648,380. Not only in that patent application is the construction of apparatus 18 fully-described, but so too is its operation. Generally speaking, apparatus 18 allows a log which is to be bucked to travel continuously through the apparatus while bucking takes place, with saw 20 "chasing" the log appropriately to a desired bucking location, and then adjusting to travel at the same speed of the log while it performs a bucking operation.

Cooperating with the other elements so far described in apparatus 10 is a scanning system 24, also referred to herein as long-configuration-determining means. As can be seen, the scanning system is located upstream from apparatus 18, relative to the transport direction of logs. In particular, system 24 is located far enough upstream from apparatus 18 to assure that the longest log which is expected to be handled can be fully scanned before it reaches the log-bucking apparatus. Included within scanning system 24, and indicated schematically by dashed lines in FIG. 1, are a first scanner subsystem 24a which is designed to generate data relating to a passing log's diameter (along its entire length), a second scanner subsystem 24b which is designed to generate data relating to a log's sweep along its length, and a third scanner subsystem 24c which is designed to generate data relating to a passing log's length. As individual units, each of these scanner subsystems is entirely conventional in construction, and might typically take the form of one of a large variety of commercially available laser-scanner devices. It is the incorporation of these scanner subsystems, and particularly subsystem 24b, along with the other components of apparatus 10, which plays a significant role in maximizing ultimate final-product yields from logs.

Data developed by the three scanner subsystems is transmitted by a conventional data bus 26, to a programmable digital computer 28, which is also referred to herein as control/decision means. Based on the particular program with which computer 28 is designed to operate, for each successive log which passes scanning system 24, the computer generates appropriate control signals which function to control the operation of apparatus 18. These signals are communicated by means of a conductor cable indicated at 30.

Details of a program appropriate to translate data received from the three scanner subsystems into proper control signals are well known to those skilled in the programming art, and form no part of the present invention. According, such details are omitted from the present discussion.

Considering now how apparatus 10 performs, shown in FIG. 1 at 32 is a log which we will assume has just passed beyond scanning system 24 and has been scanned thereby, and then transported to within bucking apparatus 18. As is well known by those skilled in the art, a log's sweep is what might be thought of as its bent-along-its-length characteristics, and these characteristics are clearly displayed, though somewhat exaggerated for illustration purposes, in the plan view of log 32 presented in FIG. 1. One of the interesting and important features of the invention is that, with conveyor device 12 having a flat, upper support surface, as was mentioned earlier, a log which is placed on the device tends to lie naturally with its basic sweep characteristics presented to an overhead viewer, such as scanner subsystem 24b. Accordingly, it is a relatively simple matter for subsystem 24b to obtain an accurate "reading" of this sweep information.

Based on the particular length, sweep and diameter information developed by system 24 and fed to computer 28, the latter produces, in accordance with instructions delivered by its internal program, appropriate control signals for the operation of apparatus 18. For the purpose of this initial illustration, let us assume that the data derived and processed by the computer has determined that three bucking operations ought to be performed at the locations indicated by the three-dash-triple-dot lines shown at 34, 35, 36. Accordingly, under the control of the computer, saw 20 chases the log as it enters apparatus 18 to locate itself adjacent log 32 at the location of line 34, and performs a first bucking operation. The saw then rechases the log to locate itself adjacent the same at the location of line 5 to perform the second decided-upon bucking operation. Thereafter it repeats the latter operation to make a cut at the location of line 36.

Figure 2:
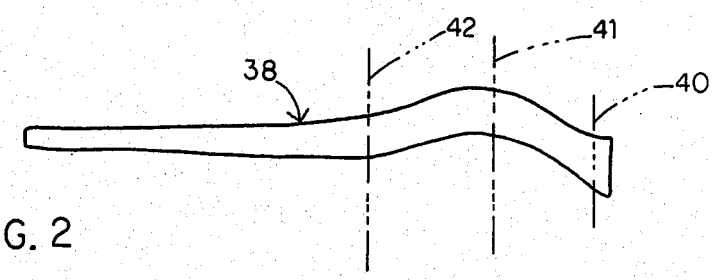
FIGS. 2–5, inclusive, are schematic views illustrating four additional different logs having sweep characteristics that differ from one-and-other, and from that of the log depicted in FIG. 1.

Switching attention now for a moment to FIG. 2, here, at 38, there is shown another log which has sweep characteristic that is quite different from that of log 2. In FIG. 2, log 38 is shown in plan view in the same manner chosen for the showing of log 32. Let us assume that this log has passed with this plan view orientation through scanner 24 to produce yet another set of sweep, length and diameter data. In this instance, computer 28 produces control signals to effect bucking, first along the line indicated by dash-triple-dot line 40, next along line 41, and thereafter, along line 42.

Figure 3:
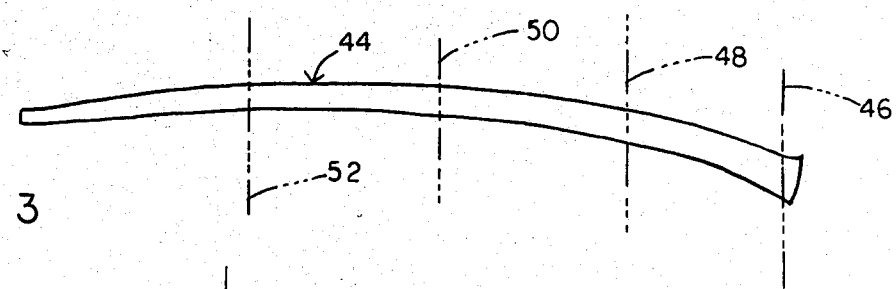

In FIG. 3 there is shown a log 44 which has yet another sweep characteristic that distinguishes it from logs 32, 38. Again, the log in FIG. 3 is depicted with the same view orientation which has been used for logs 32, 38, and so, has passed through scanning system 24 presenting this view upwardly to scanner subsystem 24b. In this case, the decision made by computer 28 is to produce four bucking operations along lines 46, 48, 50, 52.

Figure 4:
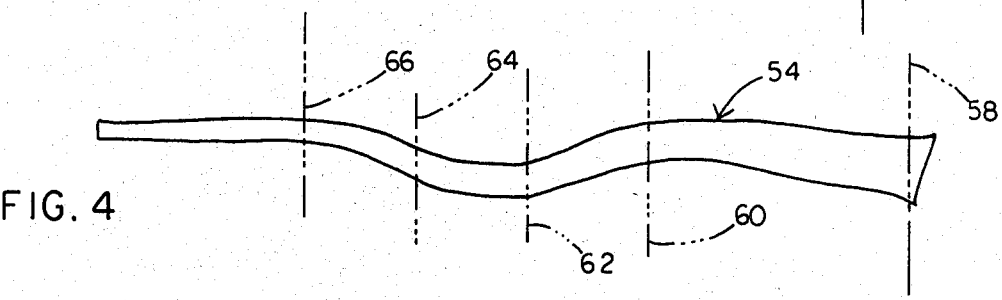
Figure 5:
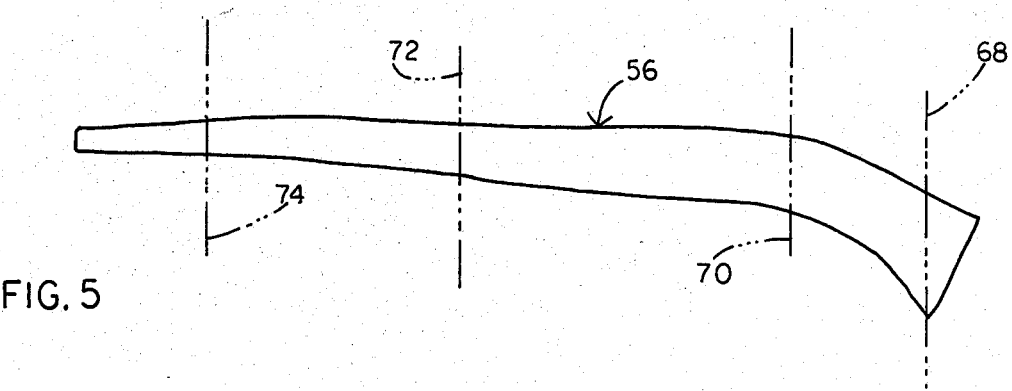

FIGS. 4 and 5 show two other logs at 54, 56, respectively. For log 54, the computer has dictated that cuts be made along lines 58, 60, 62, 64, 66, and for log 56 along lines 68, 70, 72, 74.

Accordingly, it is easy to see and understand now how the objectives set forth for the invention are attained by the same as described above. The use of a flying-saw, log-bucking apparatus, such as apparatus 18, enables log-bucking data to be implemented without delay as a log continues its movement throughout the overall apparatus. The important acquisition of log sweep data, facilitated by the way in which the log naturally tends to rest on the upper surface of conveyor device 12, cooperating with acquisition of diameter and length data developed by scanner subsystems 24a, 24c, promotes use of the most important data required in order to buck a log for maximum end-product yield.

While a preferred embodiment of the invention has been described hereinabove, it is appreciated that variations and modifications may be made without departing from the spirit of the invention.

It is claimed and desired to secure by Letters Patent:

1. High-throughput, high-end-product-recovery log-bucking apparatus featuring continuous log travel comprising transport means defining an endo log-transport path for the continuous movement of a log endo along the path, flying-saw log-bucking mechanism disposed along said path for bucking a log, while the same travels continuously along the path, at one or more selected locations along the length of the log, log-configuration-determining means located adjacent said path, upstream from said log-bucking mechanism, including means for generating data related to a log's sweep as the log travels toward said log-bucking mechanism, and control/decision means operatively connected both to said log-bucking means and to said log-configuration-determining means, responsive to log-sweep data generated by the latter, relative to a traveling log, to control bucking of the log by the former in a manner facilitating, ultimately, the optimum recovery of usable wood end-product from the log.

2. High-throughput, high-end-product-recovery log-bucking apparatus, featuring continuous log travel comprising transport means defining an endo log-transport path for the continuous movement of log endo along the path, flying-saw log-bucking mechanism disposed along said path for bucking a log, while the same travels continuously along the path, at one or more selected locations along the length of the log, log-configuration-determining means located adjacent said path, upstream from said log-bucking mechanism, including means for generating data related to a log's length, sweep and diameter characteristics as the log travels toward said log-bucking mechanism, and control/decision means operatively connected both to said log-bucking mechanism and to said log-configuration-determining means, responsive to the data generated by the latter, relative to a traveling log, to control bucking of the log by the former in a manner facilitating, ultimately, the optimum recovery of usable wood end-product from the log.

* * * * *